(12) United States Patent
Weiss et al.

(10) Patent No.: US 7,486,441 B2
(45) Date of Patent: Feb. 3, 2009

(54) OBJECTIVE AND MICROSCOPE

(75) Inventors: Albrecht Weiss, Linden (DE); Michael Ganzer, Giessen (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 10 days.

(21) Appl. No.: 11/363,916

(22) Filed: Feb. 28, 2006

(65) Prior Publication Data

US 2006/0209398 A1    Sep. 21, 2006

Related U.S. Application Data

(60) Provisional application No. 60/761,618, filed on Jan. 24, 2006.

(30) Foreign Application Priority Data

Mar. 1, 2005    (DE) .................. 10 2005 009 832

(51) Int. Cl.
G02B 21/06 (2006.01)
G02B 21/00 (2006.01)
(52) U.S. Cl. .................. 359/387; 359/368; 359/385
(58) Field of Classification Search ......... 359/368–390, 359/577–590, 738–741; 356/316–318
See application file for complete search history.

(56) References Cited

U.S. PATENT DOCUMENTS

| | | | | |
|---|---|---|---|---|
| 4,475,796 A | * | 10/1984 | Kimura | 359/387 |
| 4,634,255 A | * | 1/1987 | Suda et al. | 396/112 |
| 4,881,802 A | * | 11/1989 | Stankewitz | 359/387 |
| 5,325,231 A | * | 6/1994 | Tamura et al. | 359/387 |
| 5,946,282 A | * | 8/1999 | Hirono et al. | 369/112.02 |
| 6,504,653 B2 | | 1/2003 | Matthae et al. | 359/656 |
| 6,987,609 B2 | | 1/2006 | Tischer et al. | 359/385 |
| 7,196,787 B2 | * | 3/2007 | Uhl et al. | 356/317 |
| 2002/0097489 A1 | * | 7/2002 | Kawano et al. | 359/388 |
| 2003/0058530 A1 | | 3/2003 | Kawano | 359/385 |
| 2004/0001253 A1 | | 1/2004 | Abe et al. | 359/388 |
| 2004/0047032 A1 | | 3/2004 | Gonschor et al. | 359/368 |
| 2004/0174523 A1 | | 9/2004 | Uhl et al. | 356/317 |
| 2004/0196457 A1 | | 10/2004 | Aono et al. | 356/318 |
| 2007/0035821 A1 | * | 2/2007 | Hecker | 359/385 |
| 2007/0052958 A1 | * | 3/2007 | Ulrich et al. | 356/318 |

FOREIGN PATENT DOCUMENTS

| | | |
|---|---|---|
| DE | 101 08 796 | 9/2002 |
| DE | 101 43 481 | 3/2003 |
| DE | 102 17 098 | 11/2003 |
| DE | 102 29 935 | 1/2004 |
| WO | WO 03/087914 | 10/2003 |
| WO | WO-2005/029151 A1 | 3/2005 |

* cited by examiner

*Primary Examiner*—Thong Nguyen
(74) *Attorney, Agent, or Firm*—Darby & Darby

(57) ABSTRACT

An objective for total internal reflection microscopy includes a diaphragm disposed near to or in the plane of the objective pupil. The diaphragm includes a middle area impermeable to illumination light and permeable to detection light of a microscope, and includes an edge area permeable to the illumination light. The illumination light has a focus in the plane of the objective pupil.

28 Claims, 1 Drawing Sheet

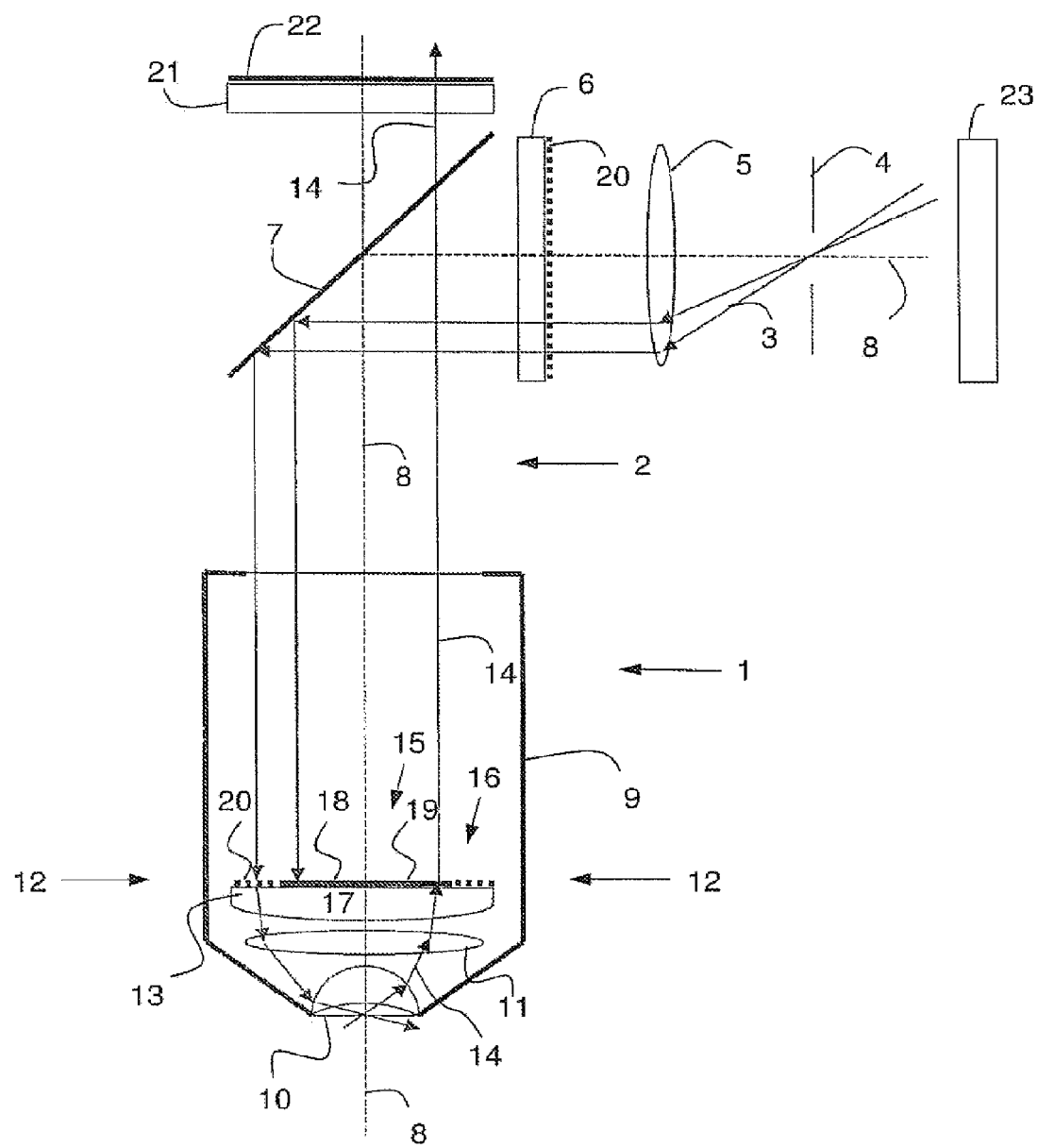
FIGURE

OBJECTIVE AND MICROSCOPE

OBJECTIVE AND MICROSCOPE

Priority is claimed in U.S. Application No. 60/761,618, filed by applicants on Jan. 24, 2006, and to German patent application DE 10 2005 009 832.0, filed on Mar. 1, 2005, the entire subject matters of both of which are hereby incorporated by reference herein.

The present invention relates to an objective for total internal reflection microscopy, whereby illumination light as well as detection light travel through the objective and whereby the illumination light has a focus in the plane of the objective pupil. Furthermore, the invention relates to a microscope having an objective and a light source, particularly for the evanescent illumination of a specimen, whereby the illumination light has a focus in the plane of the objective pupil, preferably with a corresponding objective.

BACKGROUND

The field of total internal reflection microscopy makes use of the refraction behavior of light during the transition from an optically denser medium to an optically thinner medium. Thus, for instance, the transition from cover glass (n1=1.518) to wear (n2=1.33) yields a critical angle of 61°, the angle of total reflection. Under the conditions of total reflection (angle≧61°), a stationary evanescent wave forms in the medium having the lower refractive index. The intensity of this wave decreases exponentially with the distance from the boundary surface. For this reason, fluorophores situated further away from the boundary surface are not excited. The background fluorescence is drastically reduced. The image contrast is improved in this process while, at the same time, the resolution is considerably increased. A prerequisite for utilizing the above-mentioned phenomenon is a sufficiently large difference in the refractive indices of the cover glass and the medium.

U.S. patent application publication no. 2002/0097489 discloses a microscope involving the evanescent illumination of a specimen. The microscope comprises a white-light source whose light is coupled into the specimen side via a slit diaphragm through the microscope objective for purposes of evanescent illumination. The illumination light propagates itself in the specimen slide as a result of total internal reflection, a process in which the specimen is only illuminated in the area of the evanscent field that projects from the specimen side. Microscopes of this type are known under the designation TIRFM (Total Internal Reflection Fluorescent Microscope).

The z-resolution of TIRFMs is outstanding due to the fact that the evanescent field projects only about 100 nm into the specimen.

German patent application DE 101 08 796 A1 discloses a high-aperture objective, especially for TIRF applications. The objective consists of a first lens having positive refractive power, a second lens having negative refractive power, whereby the focal length ratio between the two lenses lies within the range from −0.4 to −0.1 and the total refractive power is greater than zero. Moreover, the objective comprises two positive lenses whose diameter-to-focal length ratio is greater than 0.3 and smaller than 0.6. Furthermore, the objective comprises a negative lens and a collective lens, whereby the negative lens faces the front group and the focal length ratio of the negative lens to the collective lens iles between −0.5 and −2.

German patent application DE 102 17 098 A1 discloses an incident-illumination arrangement for TIRF microscopy. This incident-illumination arrangement comprises a source of illumination that, during operation, emits a polarized illuminating bundle of rays that propagates itself at an angle relative to the optical axis, and a deflection device that deflects the illuminating bundle of rays and couples it into the objective parallel to the optical axis. With this incident-illumination arrangement, it is provided that the illuminating bundle of rays emitted by the source of illumination has s-polarization and p-polarization directions having the phase differential and the deflection device reflects the illuminating bundle of rays x times, wherein x=(n·180°−d)/60°.

German pat. appl. DE 101 43 481 A1 discloses a microscope for TIRM Total Internal Reflection Microscopy). The microscope has a housing and an objective. The illumination light emitted by an illumination device can be coupled in via an adapter that can be slid into the microscope housing.

U.S. patent application publication no. 2004/0001253 discloses a microscope with an optical illumination system that allows a simple switchover between evanescent illumination and reflection illumination. The illumination system comprises a laser light source whose light is coupled into an optical fiber. An outcoupling optical system is also provided that focuses the light emerging from the fiber into a rear focal point of the microscope objective. The optical fiber can be moved in a plane perpendicular to the optical axis of the microscope objective.

German patent application DE 102 29 935 A1 discloses a device for coupling light into a microscope. There, laser light is directed at the preparation in the plane of the illuminated field diaphragm through a light-conductive fiber coupler configured as a slide. The invention is particularly well-suited for the TIRF method.

In scanning microscopy, a specimen is illuminated with a light beam so that the detection light emitted by the specimen can be observed as reflection or fluorescent light. The focus of an illuminating bundle of rays is moved in a plane of the specimen by means of a controllable beam deflector, generally by tilting two mirrors, whereby the deflection axes are usually positioned perpendicular to each other, so that one mirror deflects in the x direction while the other deflects in the y-direction. The mirrors are tilted, for example, employing galvanometric actuating elements. The power of the detection light coming from the object is measured as a function of the position of the scanning beam. Normally, the actuating elements are equipped with sensors to ascertain the actual position of the mirror. Especially in confocal scanning microscopy, an object is scanned in three dimensions with the focus of a light beam.

A confocal scanning microscope generally comprises a light source, a focusing optical system with which the light from the source is focused into a pinhole diaphragm—the so-called excitation diaphragm—a beam splitter, a beam deflector to control the beam, a microscope optical system, a detection diaphragm and the detectors for picking up the detection or fluorescent light. The illumination light is coupled in via a beam splitter. Via the beam deflector, the fluorescent or reflection light coming from the object returns to the beam splitter, passes through it and is subsequently focused onto the detection diaphragm behind which the detectors are located. This detector arrangement is called a descan arrangement. Detection light that does not stem directly from the focus region takes a different light path and does not pass the detection diaphragm, so that point information is obtained that yields a three-dimensional image as a result of the sequential scanning of the object with the focus of the illuminating bundle of rays. For the most part, a three-dimensional image is attained by means of layer-by-layer image data acquisition.

The system known from the state of the art have the drawback that, in order to couple in the TIRF illumination light, they at times require optical systems in the beam path of the microscope that are very complex and that occupy a lot of space. This has a detrimental impact especially on the detection beam path and often causes a loss of detection light power.

As mentioned above, these are microscopic TIRF examinations, where a specimen is illuminated at a very flat angle, namely, in order to generate total reflection on the surface of the specimen. For this purpose, the state of the art employs objectives with a very large aperture in order to attain large illumination apertures. The fluorescence excitation is done with a laser light source whereby the laser is regularly imaged onto a point at the pupil rim of the objective. It is likewise known from the state of the art to use gas-discharge lamps for the fluorescence excitation. Here, an annular diaphragm is placed into the aperture plane of the illumination beam path, so that only the pupil rim of the objective is illuminated.

The technology implemented up until now for TIRF microscopy entails the disadvantage that it requires extremely precise adjustment of the deflection mirrors, diaphragms and the like. Extremely well-corrected illumination optical systems are needed in order to achromatically image the aperture diaphragm in the objective pupil. Thus, very special microscopes with an external fluorescent illumination and a laser arrangement have been employed so far.

SUMMARY OF THE INVENTION

An aspect of the present invention is to provide a simply configured objective for total reflection microscopy that can be employed in the conventional beam path of the illumination light and of the detection light and, in another embodiment, to provide a corresponding microscope.

In an embodiment, the present invention provides an objective for total internal reflection microscopy. Illumination light and detection light are capable of traveling through the objective. The objective includes a diaphragm disposed near to or in a plane of a pupil of objective. The diaphragm includes a middle area that is impermeable to the illumination light and is permeable to the detection light, and an edge area that is permeable to the illumination light. In another embodiment, the present invention provides a microscope including the objective.

BRIEF DESCRIPTION OF THE DRAWING

The teaching of the present invention can be embodied and refined in different ways. The present invention is elaborated upon below based on an exemplary embodiment with reference to the drawing.

The only FIGURE is a schematic view of an embodiment of an objective according to the invention in the beam path of a microscope likewise according to the invention.

DETAILED DESCRIPTION

The present invention provides an objective for total internal reflection microscopy, whereby illumination light as well as detection light travel through the objective and whereby the illumination light has a focus in the plane of the objective pupil. A diaphragm is provided in the vicinity or in the plane of the objective pupil and the diaphragm has a middle area that is impermeable to the illumination light and permeable to the detection light as well as an edge area that is permeable to the illumination light. It has been recognized according to the invention that an evanescent illumination of a specimen through the objective can be implemented easily in terms of design in that a special construction, namely, a special diaphragm, is provided in the vicinity or in the plane of the objective pupil. This diaphragm is constructed or configured in such a way that it has a middle area that is impermeable to the illumination light and permeable to the detection light as well as an edge area that is permeable to the illumintation light. In other words, the excitation light is blocked in the middle area and can only pass at the pupil rim and then penetrates the specimen at a flat angle. The detection light coming from the specimen, for instance, fluorescent light, can be picked up over the entire objective aperture since the middle area is permeable to the detection light. In the simplest case, that is to say, without any restriction of the observation aperture, the edge area can likewise be permeable to the detection light.

If a reduction of the observation aperture is desired, it is advantageous for the edge area to be impermeable to the detection light, that is to say, to the fluorescent light coming from the specimen. As a result of this measure, the objective aperture or the observation aperture is reduced. The fluorescent light emitted by the specimen cannot pass the edge area and is accordingly blocked in the edge area.

In another advantageous manner, especially in order to achieve a symmetrical illumination situation, the middle area of the diaphragm that blocks the illumination light is configured as a circular area. In a likewise advantageous manner, the edge area is directly adjacent to the circular area and extends around it as an annular area. According to the elaborations above, this manner area can be permeable (entire objective aperture) or impermeable (reduced objective aperture) to the detection light.

Within the scope of a particularly simple construction, the differently permeable diaphragm areas—middle area and edge area—are configured as thin layers that are preferably applied onto a light-permeable substrate. These layers can be vapor-deposited onto the substrate. The layers can be created by a wide array of lithographic processes.

In another advantageous manner, the layers are interference layers, as a result of which the light can be influenced as a function of the wavelength. Thus, for instance, the layers can be multiband interference layers so that several fluorescence excitations can take place simultaneously. Such a configuration means that the objective can be used universally.

In concrete terms, it is conceivable for a glass surface to serve generally as the substrate for the layers. The glass surface here can be the surface of a glass slide integrated into the objective. It is likewise conceivable for the surface of a lens to serve as the substrate for the layers, whereby the lens can be flattened on the side that has the layers. It is likewise conceivable to apply the layers onto convex surfaces, as a result of which a comparable effect can be attained.

Moreover, it is possible to form the layers on the side of the substrate facing away from the object or else on the side of the substrate facing the object, whereby it should be ensured that the layers are arranged close to the plane of the objective pupil.

The present invention also provides a microscope including an objective and a light source, for example for the evanescent illumination of a specimen, whereby the illumination light has a focus in the plane of the objective pupil. A diaphragm is provided in the vicinity or in the plane of the objective pupil, and the diaphragm has a middle area that is impermeable to the illumination light and permeable to the detection light as well as an edge area that is permeable to the illumination light.

At this juncture, it should be pointed out that the microscope according to the invention employs an objective according to the invention, as described above. In order to avoid repetition, no separate mention will be made here of the features pertaining to the objective. Regarding the concrete utilization of the objective according to the invention within the scope of a microscope according to the invention, additional embodiments are advantageous. Insofar as the microscope has an illumination filter or excitation filter in the illumination beam path, this illumination filter could have the same coating as the edge area of the diaphragm or of the substrate. In this manner, the only illumination light, meant for the excitation, that passes through the illumination fitler—as a function of the configuration of the illumination filter—is the light that can pass the edge area in the objective for purposes of achieving an evanescent illumination of the specimen. Consequently, the illumination filter and the edge area of the diaphragm are coordinated with each other in a simple manner. Advantageously, the illumination filter is arranged between an illumination diaphragm (illuminated field diaphragm), and optionally an optical system, and a beam splitter, preferably in the area of the illumination light that is oriented in parallel.

It is likewise advantageous for a detection filter to be arranged in the detection beam path upstream from the detector. The emission light that was reflected from the specimen and that was able to pass the middle area of the diaphragm in the objective reaches this filter through the beam splitter. In an advantageous manner, the detection filter has the same coating as the middle area of the diaphragm or of the substrate, so that this is coordinated here as well. The detection filter prevents, among other things, undesired flare light from reaching the detector. The observation aperture is defined by the size of the middle surface area as well as by the size of the edge area through which the detection light cannot pass.

Furthermore, it should be pointed out that the detection filter can be arranged in the detection beam path at any desired place between the beam splitter and the detector.

The only FIGURE shows an embodiment of an objective 1 according to the invention in the beam path 2 of a microscope likewise according to the invention, whereby here only individual components of the microscope are shown.

Illumination light 3 comes from a laser light source 23 and reaches a beam splitter 7 via an illumination diaphragm 4 through an optical system 5 that parallelizes the light and through an illumination filter 6.

The illumination light 3 is guided via the beam splitter 7 along the optical axis 8 through the objective 1.

The objective 1 is depicted in simplified form and comprises, in addition to the objective housing 9, a merely indicated front lens 10 as well as another lens 11.

The plane of the objective pupil is indicated by the arrows designated with the reference numeral 12. In the embodiment selected here, a diaphragm 13 is provided in the plane of the objective pupil, said diaphragm 13 having a middle area 15 that is impermeable to the illumination light 3 and permeable to the detection light 14 as well as an edge area 16 that is permeable to the illumination light 3.

The fluorescent light emitted by a specimen passes along the optical axis 8 via the front lens and the other lens 11 and through a glass body 17 whose flat surface 18 serves as the substrate for vapor-deposited layers 19, 20. These layers 19, 20 ultimately form the diaphragm 13, whereby the emitted light, that is to say, the detection light 14, can pass through the middle area 15 and through the layer 19 that has been vapor-deposited there, can come out of the objective 1, travel to the beam splitter 7 and through it and then through a detection filter 21. From there, the detection light 14 reaches a detector 22.

Moreover, it can be seen in the only figure that the illumination filter 6 and the detection filter 21 are coated, namely, with the same layers as have been vapor-deposited onto the glass body 17 in the objective 1. Thus, the illumination filter 6 has the same vapor-deposited layer 20 as the one that has been vapor-deposited in the edge area 16 of the glass body 17.

The detection filter 21 has the same vapor-deposited layer 19 as the one that has been vapor-deposited in the middle area 15 of the glass body 17. Regarding other features and advantages that cannot be gleaned from the only FIGURE, in order to avoid repetitions, reference is hereby made to the rest of the description.

In conclusion, explicit mention should be made of the fact that the embodiment elucidated above merely serves to describe the claimed teaching but that the latter should not be construed as being restricted to this embodiment.

What is claimed is:

1. A microscope comprising:
    a light source configured to provide illumination light;
    an objective including a diaphragm disposed near to or in a plane of a pupil of the objective, the objective being configured to pass the illumination and detection light therethrough, the diaphragm including a middle area with a first coating impermeable to the illumination light and permeable to the detection light, the diaphragm including an edge area with a second coating permeable to the illumination light; and
    at least one of:
    an illumination filter disposed in an illumination beam path of the illumination light, the illumination filter including a third coating having a same property as the first coating, and
    a detection filter disposed in a detection beam path of the detection light, the detection filter including a fourth coating having a same property as the second coating.

2. The microscope as recited in claim 1 wherein the edge area is impermeable to the detection light.

3. The microscope as recited in claim 1 wherein the middle area has a circular shape.

4. The microscope as recited in claim 3 wherein the edge area includes an annular extending around the circular area.

5. The microscope as recited in claim 1 wherein the first and second coatings each include a respective thin layer.

6. The microscope as recited in claim 5 wherein the diaphragm includes a light-permeable substrate, the respective thin layers being disposed on the light-permeable substrate.

7. The microscope as recited in claim 6 wherein the substrate includes a glass surface.

8. The microscope as recited in claim 7 wherein the glass surface is a surface of a glass slide.

9. The microscope as recited in claim 7 wherein the glass surface is a surface of a lens.

10. The microscope as recited in claim 6 wherein the respective thin layers are disposed on a first side of the substrate, the first side include a flat shape.

11. The microscope as recited in claim 6 wherein the respective thin layers are disposed on a first side of the substrate, the first side facing away from an object to be observed.

12. The microscope as recited in claim 6 wherein the respective thin layers are disposed on a first side of the substrate, the first side facing toward an object to be observed.

13. The microscope as recited in claim 5 wherein the respective thin layers each include a respective vapor-deposited layer.

14. The microscope as recited in claim 5 wherein the respective thin layers each include a respective interference layer.

15. The microscope as recited in claim 14 wherein each of the respective interference layers include a respective multi-band interference layer.

16. The microscope as recited in claim 1 wherein the light source is configured to provide light for evanescent illumination of a specimen.

17. The microscope as recited in claim 1 wherein the microscope includes the illumination filter.

18. The microscope as recited in claim 17 further comprising an illumination diaphragm and a beam splitter, the illumination filter being disposed between the illumination diaphragm and the beam splitter.

19. The microscope as recited in claim 18 further comprising an optical system, the illumination filter being disposed between the optical system and the beam splitter.

20. The microscope as recited in claim 17 wherein the illumination filter is disposed in an area of parallel light of the illumination light.

21. The microscope as recited in claim 1 wherein the microscope includes the detection filter.

22. The microscope as recited in claim 21 further comprising a beam splitter and a detector, the detection filter being disposed in the detection beam path between the beam splitter and the detector.

23. An objective for total internal reflection microscopy, illumination light and detection light capable of traveling through the objective, the objective comprising a diaphragm disposed near to or in a plane of the pupil of the objective, the diaphragm including:
a middle area impermeable to the illumination light and permeable to the detection light; and
an edge area permeable to the illumination light,
wherein the diaphragm includes a light-permeable substrate, and wherein the edge area of the diaphragm includes a first coating disposed on the substrate, and further comprising an illumination filter disposed in an illumination beam path, the illumination filter including a second coating having a same property as the first coating.

24. The microscope as recited in claim 23 further comprising an illumination diaphragm and a beam splitter, the illumination filter being disposed between the illumination diaphragm and the beam splitter.

25. The microscope as recited in claim 24, further comprising an optical system, the illumination filter being disposed between the optical system and the beam splitter.

26. The microscope as recited in claim 23 wherein the illumination filter is disposed in an area of parallel light of the illumination light.

27. An objective for total internal reflection microscopy, illumination light and detection light capable of traveling through the objective, the objective comprising a diaphragm disposed near to or in a plane of the pupil of the objective, the diaphragm including:
a middle area impermeable to the illumination light and permeable to the detection light; and
an edge area permeable to the illumination light,
wherein the diaphragm includes a light-permeable substrate, and wherein a first coating is disposed on the light-permeable substrate, and further comprising a detection filter disposed in a detection beam path of the detection light, the detection filter including a second coating having a same property as the first coating.

28. The microscope as recited in claim 27 further comprising a beam splitter and a detector, the detection filter being disposed in the detection beam path between the beam splitter and the detector.

* * * * *

UNITED STATES PATENT AND TRADEMARK OFFICE
CERTIFICATE OF CORRECTION

PATENT NO. : 7,486,441 B2 Page 1 of 1
APPLICATION NO. : 11/363916
DATED : February 3, 2009
INVENTOR(S) : Albrecht Weiss It is certified that error appears in the above-identified patent and that said Letters Patent is hereby corrected as shown below:

On the Title Page, Item (75) In the Inventors:

Please remove "Michael Ganzer" and insert

-- Michael Ganser --

Signed and Sealed this

Seventh Day of April, 2009

JOHN DOLL
*Acting Director of the United States Patent and Trademark Office*